(12) United States Patent
Abrams

(10) Patent No.: US 8,656,940 B2
(45) Date of Patent: Feb. 25, 2014

(54) SAFETY SYSTEM FOR FLUID CONDUIT

(76) Inventor: Andrew Charles Abrams, Bryn Mawr, PA (US)

(*) Notice: Subject to any disclaimer, the term of this patent is extended or adjusted under 35 U.S.C. 154(b) by 757 days.

(21) Appl. No.: 12/716,307

(22) Filed: Mar. 3, 2010

(65) Prior Publication Data

US 2011/0214749 A1 Sep. 8, 2011

(51) Int. Cl.
*F16K 17/14* (2006.01)

(52) U.S. Cl.
USPC ................................. 137/68.14; 137/614.04

(58) Field of Classification Search
USPC ........ 137/68.14–68.17, 614.04, 517; 251/212
See application file for complete search history.

(56) References Cited

U.S. PATENT DOCUMENTS

| | | | | |
|---|---|---|---|---|
| 2,048,388 | A * | 7/1936 | Johnsen | 137/68.12 |
| 2,798,508 | A | 7/1957 | Kahn | |
| 3,542,047 | A | 11/1970 | Nelson | |
| 4,830,046 | A * | 5/1989 | Holt | 137/460 |
| 5,357,998 | A * | 10/1994 | Abrams | 137/68.11 |
| 5,699,823 | A | 12/1997 | Thompson | |
| 5,791,366 | A * | 8/1998 | Lo | 137/68.14 |
| 6,511,341 | B1 | 1/2003 | Finona et al. | |
| 6,546,947 | B2 * | 4/2003 | Abrams | 137/68.14 |
| 6,722,405 | B2 * | 4/2004 | Cessac et al. | 141/301 |
| 6,764,404 | B1 | 7/2004 | Gullickson et al. | |
| 6,957,661 | B1 | 10/2005 | Borton et al. | |
| 7,264,014 | B2 | 9/2007 | Boyd | |
| 2002/0007847 | A1 | 1/2002 | Abrams | |
| 2002/0189100 | A1 | 12/2002 | Laps | |
| 2003/0180585 | A1 | 9/2003 | Gagnon et al. | |
| 2005/0164538 | A1 | 7/2005 | Tiberghien et al. | |
| 2011/0214750 | A1 | 9/2011 | Abrams | |
| 2011/0215564 | A1 | 9/2011 | Abrams | |

FOREIGN PATENT DOCUMENTS

GB 2076917 A 12/1981

* cited by examiner

*Primary Examiner* — Kevin Lee
*Assistant Examiner* — Macade Brown
(74) *Attorney, Agent, or Firm* — Cheryl R. Figlin, Esq.; Feigin & Associates, LLC

(57) ABSTRACT

A housing at each end of a conduit defines a valve seat. A connector is connected to a valve body in each housing and holds the bodies away from the seats until the conduit fails, after which each body moves into contact with the corresponding seat. A compression zone between each body and the corresponding seat is sufficiently large to reduce heat generated thereat from adiabatic compression of the fluid flowing therethrough. In a variation, two heat-dissipating ribs are externally positioned on each housing adjacent the compression zone. In another variation, the connector is a generally helical spring within the conduit and sized to be in contact with an interior wall of the conduit so that the spring provides structural strength thereto. In another variation, a third housing is employed as a one-way check valve.

17 Claims, 3 Drawing Sheets

SAFETY SYSTEM FOR FLUID CONDUIT

FIELD

The present disclosure relates to high pressure fluid delivery systems and more particularly to a safety system for a conduit which is part of the high pressure delivery system.

BACKGROUND

A prevailing problem in high pressure fluid delivery systems such as those used to fill containers with compressed gases such as oxygen, nitrogen, carbon dioxide and the like is the risk that a conduit which is part of the fluid delivery system may fail. Typically, the conduit is constructed as a hose or the like from a hardy flexible material such as treated and reinforced rubber, neoprene, nylon, TEFLON polymer, stainless steel and the like.

However, on occasion, a conduit fails by rupturing or splitting. When a hose/conduit ruptures, at least two hazards are present. First, the two pieces of the conduit which result from the rupture are free to whip around wildly under the force of the compressed gases which are being discharged through the ruptured conduit from the container being filled and from the discharge manifold of the fluid supply. Until the conduit can be constrained, substantial risk of injury to personnel and damage to equipment exists. Second, a discharge of gas from the manifold and the container through the ruptured hose/conduit can lead to a costly waste of gas, or even worse, can fill an environment with hazardous fumes.

It would therefore be desirable to have a system which would restrain a ruptured high pressure conduit from whipping about, and at the same time would be capable of preventing gases from leaking from the conduit through the rupture.

SUMMARY

The aforementioned need is satisfied by a safety system for a fluid conduit that has first and second ends. In one variation of the system, a housing is provided at each end of the conduit and defines a valve seat. Each valve seat is normally a first predetermined distance from the other and is movable away from the other when the conduit fails. The housing includes a generally cylindrical portion and a generally tapered portion defining the valve seat, where the cylindrical portion and the tapered portion meeting at a generally transverse plane.

A valve body is disposed within each housing such that the valve seats are disposed between the valve bodies. The valve bodies and the valve seats cooperate to define valves. A connector is connected to each of the valve bodies and holds the valve bodies apart a second distance which is greater than the first distance so that each valve body resides generally in the cylindrical portion of the corresponding housing until the conduit fails. A retainer is disposed within each housing and cooperates with the connector to retain the valve bodies against movement to permit fluid to flow through the conduit until the conduit fails.

The connector is operative when the conduit fails and the valve seats move away from each other to retain the valve bodies at the second distance so that the valve seats move toward the valve bodies and close the valves, or if the distance between the valve seats does not change, to permit the valve bodies to move toward each other so that the valve bodies move toward the valve seats to close the valves. Each valve body moves a third distance into contact with and past the plane and into the tapered portion of the corresponding housing to close the corresponding valve when the conduit fails. The third distance corresponds to a compression zone between the valve body and the corresponding valve seat and is sufficiently large to reduce heat generated in the compression zone from adiabatic compression of the fluid flowing through the compression zone.

In another variation of the system, two heat-dissipating ribs are externally positioned on each housing adjacent the compression zone of the housing to dissipate heat generated thereat. Each rib extends generally circumferentially about the housing and generally radially from the housing. In yet another variation of the system, the connector is a generally helical spring residing within the conduit and sized to be in substantially complete contact with an interior wall of the conduit so that the spring provides structural strength to the conduit.

In another variation, a third housing is positioned in series with the conduit and coupled to one of the first and second housings to permit fluid to flow through the conduit in a first direction and to prevent flow through the conduit in a second direction opposite the first direction. The valve body of the third housing is un-tethered and acts as a one-way check valve.

BRIEF DESCRIPTION OF THE DRAWINGS

The foregoing summary as well as the following detailed description of various embodiments of the present subject matter will be better understood when read in conjunction with the appended drawings. For the purpose of illustrating the various embodiments of the subject matter, there are shown in the drawings embodiments that are presently preferred. As should be understood, however, the subject matter considered to be inventive is not limited to the precise arrangements and instrumentalities shown. In the drawings.

DETAILED DESCRIPTION OF PREFERRED EMBODIMENTS

Figure 1:
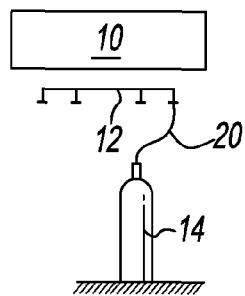
FIG. 1 is a schematic drawing of an apparatus for filling a cylinder or the like with compressed fluid under high pressure.

Certain terminology may be used in the following description for convenience only and is not considered to be limiting. For example, the words "left", "right", "upper", "lower", "top", "bottom", "front", and "back" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

In FIG. 1 a delivery system for filling containers with compressed fluids is illustrated as comprising fluid supply 10 such as a reservoir, or fluid compressing means, or the like. The supply 10 may be connected by a discharge manifold 12 to a plurality of containers 14 to which the fluid is to be transferred.

Typically, the containers 14 may be gas cylinders which are well known in the art. Conduits 20 which may be elongated flexible members are connected between the discharge manifold 12 and the containers 14.

Typically, the conduits 20 are hoses made of reinforced neoprene, rubber, neoprene, nylon, TEFLON polymer, stainless steel and the like so that they have a high degree of flexibility and are capable of withstanding the high pressures which they encounter from the compressed fluids that move through them.

Figure 2:
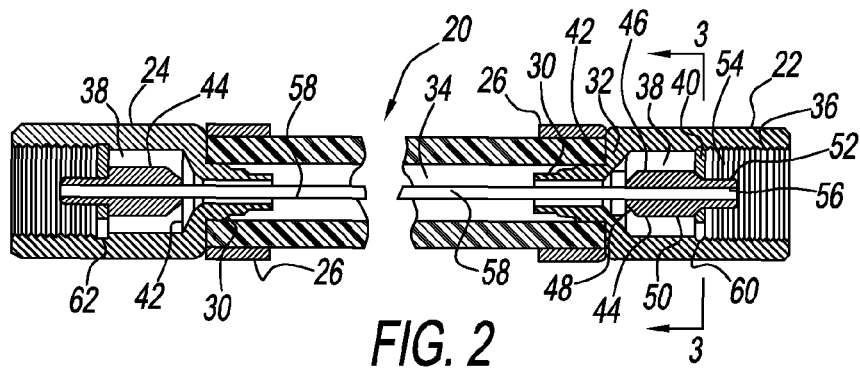
FIG. 2 is a cut-away view of a hose or other conduit constructed in accordance with one form of the inventive subject matter with the valves therein positioned to permit fluid flow.

In FIG. 2 one of the conduits 20 is shown in detail. The conduit 20 includes a housing 22 at one end and an identical housing 24 at its other end. The housings 22 and 24 are connectors which enable the conduit 20 to be connected to other elements in the fluid handling system. Since the two housings are identical, the following detailed description of housing 22 will also suffice as a description of housing 24. Housing 22 is connected to conduit 20 by a ferrule 26 which cooperates with a complementary elongated cylindrical hollow member 30 that extends from the end wall 32 of the housing 22 and into the passage 34 defined by the conduit 20.

As best seen in FIG. 2 the housing 22 is an elongated, hollow, cylindrical element which is connected by end wall 32 and member 30 to the conduit 20 and has threads 36 at its other end for connection to another element in the fluid handling system. The housing 22 has an inner wall that includes a valve chamber 38 which is defined by a ledge 40 that faces away from end wall 32 and a tapered valve seat 42 that lies adjacent end wall 32. The tapered valve seat 42 lies between the ledge 40 and the end wall 32 and faces ledge 40.

As explained above, member 30 cooperates with the ferrule 26 to clamp the conduit 20 between them so that the housing 22 is securely connected to the conduit 20 for the receipt of and transmission of fluid under high pressure. It also serves as a cable guide as will be explained herein. A valve body 44 is disposed in the valve chamber 38. Preferably, the valve body 44 includes an elongated, cylindrical member 46 having a tapered end 48 and a rear wall 50. The taper at end 48 corresponds to the taper of the valve seat 42 so that they can cooperate to prevent the flow of fluid when they are in engagement with each other. A distal end 52 extends from the rear wall 50 of the valve body 40 and comprises an elongated stem-like member 54 of relatively small diameter relative to the elongated, cylindrical member 46. Stem-like member 54 extends away from the valve seat 40.

Each of the valve bodies 44 and stem-like members 54 include a longitudinally extending, axial passage 56 of relatively small diameter through which a relatively stiff cable 58 or other suitable flexible and bendable member of predetermined length can be received. The valve body 44 may be connected to the cable 58 by swaging, welding, or other suitable means so that the cable 58 cannot separated from the valve body 44 under the strong forces which will be present should the conduit 20 rupture.

Figure 3:
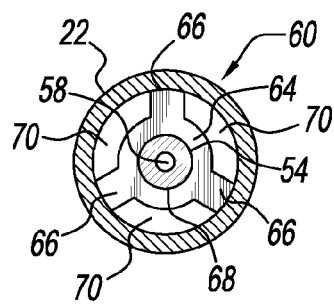
FIG. 3 is a section view taken along lines 3-3 of FIG. 2.

Referring to FIGS. 2 and 3, valve body retainers 60 and 62 are provided in housings 22 and 24 respectively. Since the two retainers 60 and 62 are identical the following detailed description of retainer 60 will also suffice as a description of retainer 62. Referring to FIG. 3, retainer 60 is a disc that includes a generally annular central member 64 having a plurality of arms 66 extending radially outwardly from it. The center of the annular member 64 comprises an aperture 68. Retainers 60 and 62 are disposed on ledges 40 in each housing 22 and 24. Each retainer is fixed on the ledge by being force fit, clamped, welded or secured by any suitable means that will hold it in place for a reason that will become apparent. The distance between the retainers 60 and 62 is about the same as the distance between the rear walls 50 of the valve bodies 44.

As best seen in FIG. 2 the member 30 and the stiffness of the cable 58 cause the valve bodies 44 to lie with their rear walls 50 against their respective retainers 60 and 62 with their respective stems 54 extending through the apertures 68. Under normal operating conditions, compressed fluids flow through conduit 20, through the fluid passages 70 defined by the space between the arms 66 on each retainer 60 and 62 and the inner wall of the housings 22 and 24, and through the opening between each valve seat 42 and its respective valve body 44. Since the cable 58 is confined by the wall of conduit 20, and is long enough arid sufficiently stiff to keep the valve bodies in engagement with the retainers 60 and 62, as is apparent from FIG. 2, neither valve body can move within its chamber since such movement is blocked by the retainer at the other end of the conduit.

Figure 4:
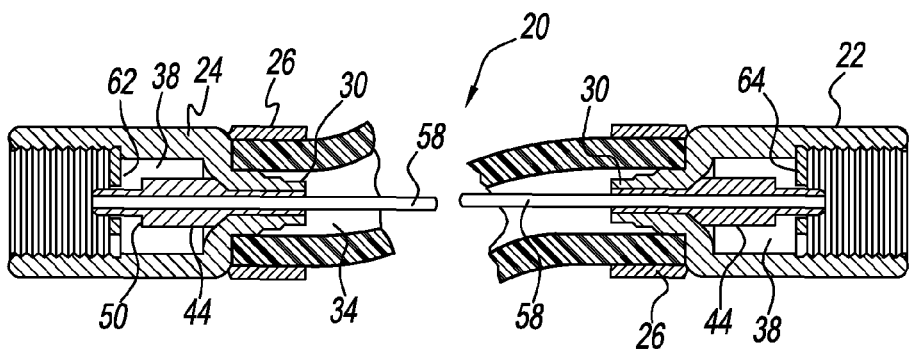
FIG. 4 is a cut-away view similar to that of FIG. 2 but showing the valves positioned to block fluid flow.

Should the conduit 20 fail by either splitting or by rupture, the valve bodies 44 and valve seats 42 will move into engagement with each other thereby stopping the flow through the conduit 20 at each of its ends as seen in FIG. 4. Accordingly, not only will discharge from the supply manifold be stopped, but also discharge from the container being filled will be stopped.

If the supply 10 or one of the containers 14 should fall during filling, the conduit 20 may fail. In this case the ends of the conduit will move with the item to which they are connected. Therefore, the valve seats 42 will be drawn away from each other and into engagement with their respective valve bodies 44 since the cable 58 will be drawn taut by the movement the conduit ends away from each other.

If the supply 10 and containers 14 are fixed, they will not be displaced when the conduit fails. In this case the valve bodies 44 will be urged into engagement with their respective valve seats 42 due to the pressure differential across the valve bodies 44 in that there is still high pressure fluid in the supply 10 and container 14 bearing against the valve bodies 44. When conduit 20 fails, cable 58 is released from its confinement within the conduit and can flex to permit the valve bodies 44 to move toward the valve seats 42. Further, because the cable 58 extends through the conduit 20, it will serve as a guide for a ruptured conduit, thereby preventing the ends of the conduit from being whipped about by the discharging fluid. Still further, even if the cable were to fail as a result of the rupture, fluid flow will still be stopped at each end of the conduit since the cable 58 will not be holding the valve bodies 44 apart. It is significant to note that the advantages of the inventive subject matter are achieved by a structure that is entirely within the conduit. Thus, there is no external apparatus that might be inadvertently snagged, damaged or destroyed thereby rendering the features of the inventive subject matter unavailable when needed.

In various embodiments, it is to be understood that the device and method disclosed above can be used with conduits 20 of varying sizes and materials. For example, the conduit 20 can be a relatively flexible hose or tube or even a relatively rigid pipe or duct, among other things. Moreover, it is to be understood that the plunger-type valve body 44 may alternately be embodied as a number of sliding members, as is the case in the aforementioned U.S. Pat. Nos. 5,357,998 or as 6,260,569 and 6,546,947 as a flapper, each of which is incorporated herein by reference in its entirety.

Figure 5:
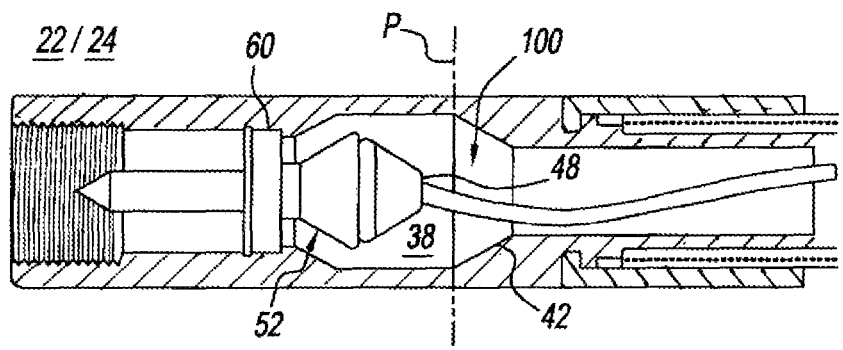
FIG. 5 is a partial cut-away view similar to that of FIGS. 2 and 4 and shows a valve housing constructed to include a relatively larger compression zone.

In one variation of embodiments of the inventive subject matter, and turning now to FIG. 5, a plunger-type valve body 44 is provided in the housing 22/24 in a manner similar to that shown in FIG. 2. Here, though, the valve body 44 is positioned against the retainer 60 during normal, open operation and is relatively farther from the tapered valve seat 42. Accordingly, and as shown in FIG. 5, during such normal, open operation, the valve body 44 and the valve seat 42 define therebetween a compression zone 100 within the valve chamber 38 that is relatively larger as compared with that of FIG. 2.

With such a relatively larger compression zone 100 as is shown in FIG. 5, it should be understood that the housing 22/24 does not suffer as much from excessive heat generated by the fluid flowing therethrough, as compared with the housing 22/24 of FIG. 2. In particular, it is to be appreciated that such heat arises from adiabatic compression that occurs when the fluid enters such compression zone 100, and such heat can be significant, especially as the pressure and/or the flow rate of the fluid increases. Notably, such heat if extreme can even damage or destroy the housing 22/24. Thus, by increasing the volume of the compression zone 100, as is shown in FIG. 5 compared with FIG. 2, the effect of adiabatic compression is spread out over the increased volume and thereby reduced. As a result, heat generated in connection with such adiabatic compression is likewise reduced.

In various embodiments, the compression zone 100 is constructed to be relatively larger as is shown in FIG. 5 by reducing the axial length of the plunger-type valve body 44, increasing the axial length of the valve chamber 38, or a combination thereof. While such relatively larger compression zone 100 may be quantified in many appropriate forms, it is to be appreciated that in the normal, open position of the valve body 44 in FIG. 2, the tapered end 48 of the valve body 44 just contacts the generally transverse plane P (FIG. 5) where the valve chamber 38 begins to taper to the tapered valve seat 42 thereof.

In contrast, in the normal, open position of the valve body 44 in FIG. 5, the tapered end 48 of the valve body 44 has not as yet approached the plane P that separates the cylindrical portion and the tapered portion of the valve chamber 38. As should be understood, the valve body 44 resides within such cylindrical portion when in the normal, open position. Thus, with the relatively larger compression zone 100 in FIG. 5, the tapered end 48 of the valve body 44 moves into contact with and past the aforementioned plane P when the valve body 44 moves from the normal, open position (as shown in FIG. 5) to the closed position.

Thus, the valve body 44 of FIG. 5 as compared to that of FIG. 2 must travel a farther distance to the closed position where the tapered end 48 thereof encounters the tapered valve seat 42. As shown in FIG. 5, such distance is about 50 percent greater than the distance from the plane P to the closed position, although other distances may also be provided.

Figure 6:
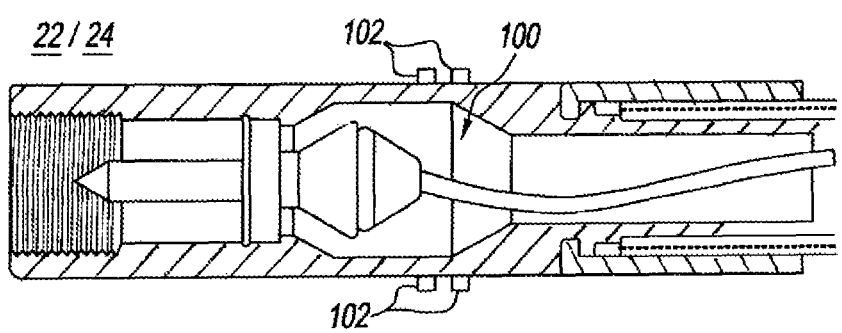
FIG. 6 is a partial cut-away view similar to that of FIGS. 2 and 4 and shows a valve housing constructed to include exterior heat-dissipating ribs adjacent the compression zone.

In another variation of embodiments of the present inventive subject matter, and turning now to FIG. 6, the exterior of the housing 22/24 is provided with ribs 102 in the axial region of the compression zone 100. As should be understood, each rib 102 extends generally circumferentially about the exterior of the housing 22/24 adjacent the compression zone 100, generally radially from the housing 22/24 a relatively short distance of perhaps an eighth of an inch, a quarter of an inch, a half of an inch, or so, and also generally axially with respect to the housing 22/24 a relatively short distance of perhaps an eighth of an inch, a quarter of an inch, or so.

As may be appreciated, such ribs 102 act to dissipate the heat generated by the fluid flowing through the housing 22/24. Again, it is to be appreciated that such heat arises from adiabatic compression that occurs when the fluid enters such compression zone 100. Here, and as should be understood, the ribs dissipate the heat by increasing the surface area between the housing 22/24 and the surrounding environment and thereby increasing the rate of heat transfer. Notably, in various embodiments, only a limited number of ribs 102 are provided, such as for example one or two ribs 102. Thus, tooling required to impart the housing 22/24 with such ribs 102 during manufacturing is minimized.

In yet another variation of embodiments of the present inventive subject matter, the cable 58 within the conduit 20 is constructed from a non-ferrous material. As may be appreciated, such a non-ferrous material for the cable 58 is particularly useful when the fluid in the conduit 20 is oxygen or the like which would cause a ferrous cable 58 to rust. Similarly, in yet another variation of embodiments of the present inventive subject matter, the cable 58 within the conduit 20 is constructed from a rod material having increased rigidity. As may be appreciated here, such increased rigidity may be required in situations where the conduit 20 is especially large in cross-sectional diameter, such as for example about four inches or so.

In still another variation of embodiments of the present inventive subject matter, the cable 58 within the conduit 20 is replaced by a generally helical spring. As may be appreciated, the spring 104 (FIG. 7) is appropriately sized and configured to urge each valve body 44 into the normal, open position against the respective retainer 60 during normal operation of the conduit 20, and also to move each valve body 44 into the closed position against the tapered valve seat 42 in the event that the conduit 20 fails. Thus, the spring 104 functions in a similar manner as the cable 58.

Figure 7:
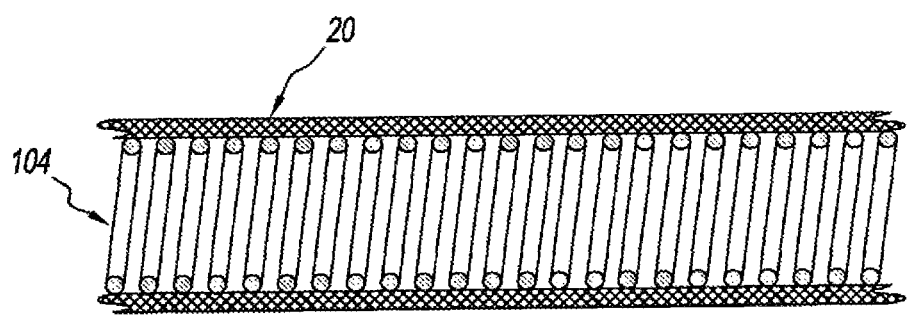
FIG. 7 is a cut-away view similar to that of FIGS. 2 and 4 and shows a conduit constructed to include a spring rather than a cable.

Notably, and as seen in FIG. 7, the spring 104 resides within the interior of the conduit 20 and is sized to be in substantially complete contact with the interior wall of the conduit 20. Thus, the spring 104 additionally functions to provide the conduit 20 with structural strength. As such, the conduit 20 may be constructed from a relatively lighter grade of material, thus reducing material costs in connection with such conduit 20.

As may be appreciated, the use of a spring 104 in the conduit 20 prompts a consideration of whether the conduit 20 with the spring 104 therein can be coiled, such as may be performed to store the conduit 20 and/or package the conduit for shipping and the like. In particular, if the spring 104 is too large in diameter relative to the length of the conduit 20, coiling the conduit 20 with the spring 104 therein may be difficult if not impossible, especially if the coiling itself has a relatively small diameter. Essentially, the spring 104 may bunch if the coiling is too tight, or may prevent such coiling from being performed.

Generally, a conduit 20 with a spring 104 of relatively modest diameter, perhaps on the order of ¼ to ½ inch or so, can be coiled with relative ease, presuming the length of the conduit 20 is beyond of a minimum, perhaps on the order of 7 feet or so. In contrast, a conduit 20 with a spring 104 of relatively large diameter, perhaps on the order of 4 to 8 inches or so, cannot be coiled in any significant manner regardless of the length of the conduit 20. Thus, in various embodiments of the present innovation, the length of the conduit 20 is taken into consideration when determining whether a spring 104 of a set diameter is employed therein, and also the need to coil the conduit 20 is taken into consideration when determining whether a spring 104 of a set diameter is employed therein.

Figure 8:
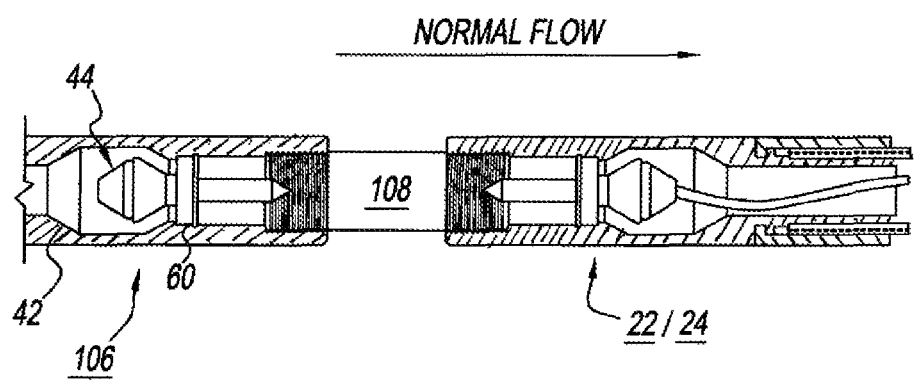
FIG. 8 is a partial cut-away view similar to that of FIGS. 2 and 4 and shows an additional valve housing in-line with a hose such as that of FIGS. 2, 5, and 6 and acting as a one-way check valve.

In yet another variation of embodiments of the present inventive subject matter, and turning now to FIG. 8, a valve housing 106 similar to if not identical with the valve housings 22/24 is placed in-line/in series with the hose or conduit 20. As shown in FIG. 8 (and FIGS. 5 and 6 as well), the valve arrangement in each of the housings 22/24/106 is a poppet-type valve arrangement, although other types of valve arrangements may also be employed in each of the housings 22/24/106, such as for example a flapper-type valve arrangement or a multi-wedge valve arrangement.

Notably, the valve body 44 within the valve housing 106 is not tethered to any cable such as the cable 58 set forth above, any spring such as the spring 104 set forth above, or any other type of tether. Accordingly, the valve body 44 effectively floats within the housing 106 and is free to slide generally axially from one side where the valve body 44 is generally in contact with the valve retainer 60 to the opposite side where the valve body 44 is generally in contact with the valve seat 42. As may be appreciated, the position of the valve body 44 is thus determined by the general flow of fluid within the housing 106 and also the housings 22/24 and conduit 20.

In particular, and as shown in FIG. 8, when fluid is flowing in what has been designated as a normal direction from left to right, the valve body 44 is urged by such normal flow to the right and into stopping contact with the retainer 60. As such, the valve body 44 is in an open position where the normal flow of the fluid is not generally impeded by the valve body 44 and retainer 60. In contrast, when fluid is flowing in a backward direction opposite the normal direction and from right to left, the valve body 44 is urged by such backward flow to the left and into stopping contact with the valve seat 42. As such, the valve body 44 is in a closed position where the backward flow of the fluid is generally impeded by the valve body 44 and valve seat 42. Thus, the housing 106 as installed in-line/in series with the conduit 20 acts as a one-way check valve that generally allows the normal flow and generally prevents the backward flow of the fluid through the conduit 20.

As may be appreciated, the housing 106 that implements the one-way check valve for the conduit 20 is placed in-line or in series with such conduit by being appropriately coupled at an appropriate end thereof to one of the housings 22/24 by way of a coupling device 108. Such coupling device 108 may be rigid or flexible and may be any appropriate coupling device, such as for example a length of coupling hose, a copper or brass pipe, a length of conduit such as the conduit 20, or the like. The housing 106 may be coupled at the other end thereof to an external element by way of threads akin to the threads 36 (not shown), another coupling hose or conduit attached to a ferrule (not shown) on the housing 106 akin to the ferrule 26, or the like.

As shown in FIG. 8, and again, the normal flow is from the left to the right. However, such normal flow may be reversed in any of several manners. For example, the housing 106 may alternately be manufactured with the valve body 42 and retainer 60 switched and with the valve body appropriately repositioned within the housing 106. Alternately, the housing 106 as shown may be detached from the one housing 22/24 and attached to the other housing 22/24. Also alternately, the entire system including the housings 22/24/106 and the conduit 20 may be detached from the external elements, reversed in an end-to-end manner, and then re-attached to the external elements.

While the inventive subject matter has been described with respect to particular embodiments, it is apparent that other embodiments can be employed to achieve the intended results. Thus, the scope of the inventive subject matter should not be limited by the foregoing description, but rather only by the scope of the claims appended hereto.

The invention claimed is:

1. A safety system for a fluid conduit comprising: a flexible conduit having first and second ends: a housing at each end of the conduit defining a valve seat, each valve seat normally being a first predetermined distance from the other, and being movable away from the other when the conduit fails, the housing including a generally cylindrical portion and a generally tapered portion defining the valve seat, the cylindrical portion and the tapered portion meeting at a generally transverse plane; a valve body disposed within each housing, the valve seats being disposed between the valve bodies, the valve bodies and the valve seats cooperating to define valves; a connector connected to each of the valve bodies and holding the valve bodies apart a second distance which is greater than the first distance so that each valve body resides general in the cylindrical portion of the corresponding housing such that the tapered portion of the valve body is spaced from the generally transverse plane until the conduit fails; wherein the connector comprising a generally helical spring residing within the conduit and sized to be in substantially complete contact with an interior wall of the conduit so that the spring provides structural strength to the conduit: and a retainer disposed within each housing and cooperating with the connector to retain the valve bodies against movement to permit fluid to flow through the conduit until the conduit fails, the connector being operative when the conduit fails and the valve seats move away from each other to retain the valve bodies at the second distance so that the valve seats move toward the valve bodies and close the valves, or if the distance between the valve seats does not change, to permit the valve bodies to move toward each other so that the valve bodies move toward the valve seats to close the valves, each valve body moving a third distance into contact with and past the plane and into the tapered portion of the corresponding housing to close the corresponding valve when the conduit fails, the third distance corresponding to the compression zone between the valve body and the corresponding valve seat and being sufficiently large to reduce heat generated in the compression zone from adiabatic compression of the fluid flowing through the compression zone.

2. The system of claim 1 wherein each valve body is disposed between the corresponding retainer and valve seat.

3. The system of claim 1 wherein each housing includes a valve chamber within which resides the corresponding valve body and retainer, the valve chamber defining the corresponding valve seat.

4. The safety system for a fluid conduit of claim 1 the system further comprising two heat-dissipating ribs externally positioned on each housing adjacent the compression zone of the housing to dissipate heat generated thereat, each rib extending generally circumferentially about the housing and generally radially from the housing.

5. The system of claim 4 wherein each valve body is disposed between the corresponding retainer and valve seat.

6. The system of claim 4 wherein the connector comprises an elongated stiff, yet flexible member that extends through the conduit.

7. The system of claim 4 wherein each housing includes a valve chamber within which resides the corresponding valve body and retainer, the valve chamber defining the corresponding valve seat.

8. The system of claim 1 wherein the helical spring has a diameter of about ¼ to ½ inches and the conduit has a length of at least 7 feet, whereby the conduit can be coiled with the spring therein.

9. The system of claim 1 wherein the helical spring has a diameter of about 4 to 8 inches, whereby the conduit cannot be coiled with the spring therein.

10. The safety system for a fluid conduit of claim 1, further comprising a third housing, said third housing having a valve seat and having disposed therein a valve body and retainer, the valve body and valve seat of said third housing cooperating to define a valve; a retainer disposed within said third housing, the third housing being positioned in series with the conduit and coupled to one of the first and second housings to permit fluid to flow through the conduit in a first direction and to prevent flow through the conduit in a second direction opposite the first direction, the valve body of the third housing being untethered and acting as a one-way check valve.

11. The system of claim 10 wherein the first, second, and third housings are substantially identical but the valve body of the third housing being un-tethered.

12. The system of claim 10 wherein the valve of each housing is a poppet valve.

13. The system of claim 10 wherein the valve of each housing is a multi-wedge valve.

14. The system of claim 10 wherein the valve of each housing is a flapper valve.

15. The system of claim 10 wherein the valve body of the third housing is free to slide generally axially within the third housing between a first side where the valve body is generally in stopping contact with the retainer of the third housing and a second side opposite the first side where the valve body is generally in stopping contact with the valve seat of the third housing, according to the flow of fluid through third housing and also through the first and second housings and the conduit.

16. The system of claim 15 wherein the valve body of the third housing as urged by the flow of fluid into stopping contact with the retainer of the third housing is in an open position where the flow of the fluid is not generally impeded by the valve body and retainer, and wherein the valve body of the third housing as urged by the flow of fluid into stopping contact with the valve seat of the third housing is in a closed position where the flow of the fluid is generally impeded by the valve body and valve seat.

17. The system of claim 10 wherein the third housing is coupled to one of the first and second housings by way of one of a length of coupling hose, a pipe, and a length of conduit.

* * * * *